(12) United States Patent
Chen et al.

(10) Patent No.: US 6,307,550 B1
(45) Date of Patent: Oct. 23, 2001

(54) EXTRACTING PHOTOGRAPHIC IMAGES FROM VIDEO

(75) Inventors: Shenchang Eric Chen, Los Gatos; Jonathan Worthen Brandt, Santa Cruz, both of CA (US)

(73) Assignee: Presenter.com, Inc., San Jose, CA (US)

( * ) Notice: Subject to any disclaimer, the term of this patent is extended or adjusted under 35 U.S.C. 154(b) by 0 days.

(21) Appl. No.: 09/339,475

(22) Filed: Jun. 23, 1999

Related U.S. Application Data

(63) Continuation-in-part of application No. 09/096,720, filed on Jun. 11, 1998.

(51) Int. Cl.$^7$ .................................................. G06T 17/00
(52) U.S. Cl. ........................ 345/418; 345/302; 345/473
(58) Field of Search .................................. 345/418, 420, 345/433, 302, 473

(56) References Cited

U.S. PATENT DOCUMENTS

| | | |
|---|---|---|
| 4,698,682 | 10/1987 | Astle . |
| 4,783,833 | 11/1988 | Kawabata et al. . |
| 5,253,065 | 10/1993 | Richards et al. . |
| 5,261,041 | 11/1993 | Susman . |
| 5,267,034 | 11/1993 | Miyatake et al. . |
| 5,592,228 | 1/1997 | Dachiku et al. . |
| 5,638,133 | 6/1997 | Squier et al. . |
| 5,751,281 | 5/1998 | Hoddie et al. . |

OTHER PUBLICATIONS

Studio DV (Trademark of Pinnacle System), pp. 3–1–3–11, 7–4–7–7.*
MPEG–4 Overview Fribourg Version, International Organisation for Standardisation, Coding of Moving Pictures and Audio, Rob Koenen, ISO/IEC JTC1/SC29/WG11 N1909, Oct. 1997 (43 pages).
"Growing Number of Shutterbugs opt for Electronic Photo Equipment Over Traditional Cameras", Benny Evangelista, San Francisco Chronicle, pp. C1, C3–C4, Jun. 14, 1999.

* cited by examiner

*Primary Examiner*—Cliff N. Vo
(74) *Attorney, Agent, or Firm*—Blakely, Sokoloff, Taylor & Zafman, LLP (57) ABSTRACT

Generating photographs from a video. Segments of the video for which frame-to-frame background motion is less than a threshold are identified. For each of the segments, video frames in the segment are combined to generate a photograph representative of the segment.

12 Claims, 8 Drawing Sheets

EXTRACTING PHOTOGRAPHIC IMAGES FROM VIDEO

This is a continuation-in-part of copending U.S. application Ser. No. 09/096,720 filed Jun. 11, 1998.

FIELD OF THE INVENTION

The present invention relates to the field of image processing, and more particularly to automatically extracting photographic images from a video.

BACKGROUND OF THE INVENTION

Historically, video cameras and still image cameras have been used for different applications and have occupied different consumer markets. Most still image cameras do not possess the image storage and rapid capture capability of video cameras and therefore are unsuitable for capturing and recording video clips. Conversely, the video resolution and quality produced by most video cameras are too low for producing high quality still images. Consequently, people who wish to capture both videos and high quality still images must usually have both a video camera and a still image camera.

SUMMARY OF THE INVENTION

A method and apparatus for generating photographs from a video is disclosed. Segments of the video for which frame-to-frame background motion is less than a threshold are identified and, for each of the segments, the video frames in the segment are combined to generate a photograph representative of the segment.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A method and apparatus for generating still images from a video is described. The individual frames of the video are analyzed to automatically identify at least three different types of shots: still shots, pan shots and zoom shots. When a still shot is identified, multiple video frames from the still shot are combined to create a single high-resolution resolution image. For a pan shot, multiple video frames are stitched together to create a high-resolution panoramic image. For a zoom shot, multiple video frames are combined to produce a multiple-resolution still image. In shots that include both pan and zoom, a multiple-resolution panoramic image is generated. Because the processing of the input video is automatic, the video can be processed unattended and without the need to learn complicated image editing operations.

It is contemplated that the automatic generation of still images from video may be provided as a service to video camera users. A user may deliver a video to a still image generation service which creates a set of high quality still images for the user in return for a fee. In this way, videos of weddings, parties, vacations, real estate tours, insurance records, etc. may be used to generate a corresponding set of high quality photographic images. The video may be physically delivered to the still image generation service in the form of a video recording medium such as a disk or tape, or the video may be uploaded electronically from an end user computer. The set of still images generated from the video may likewise be provided to the user either on a physical recording medium (including the medium on which the video was supplied) or by transmission via a communications network. For example, the still images may be provided to the end user as a set of printed photographs, or posted on a server computer for viewing or download by the end-user or parties authorized by the end-user. In the case of posting the still images on the server computer, the end-user or other authorized party may be allowed to select which of the printed photographs to download, paying a fee for each selected still image.

In one embodiment, still images generated from a user-supplied video may be formatted into an electronic album of photographic images referred to herein as a "video album." The video album may be delivered on a recording medium, including the medium on which the source video 10 was recorded, or posted on a user-accessible computer network. In the case of a still image generation service, the album may be prepared automatically, with the individual photographs being arranged based on default criterion such as their order of appearance in the video. Text annotations of the video may be generated automatically based on the corresponding audio track. In the case of user processing of the source video 10, the user may index the individual photographs of the video album according to a number of different type of criteria including, without limitation, order of appearance in the video, nature of the shot (e.g., still image, panoramic image, zoom image), subject matter of the photographs, user preference and so forth. The user may also enter text annotations.

In one embodiment, a still image generation service is provided in the form of a video processing kiosk which includes a disk or tape reader into which a user may insert a video recording medium. The kiosk includes a video processing engine to identify still, pan and zoom shots as described above and to automatically display a set of high quality still images to the kiosk user. The kiosk may then prompt the user to select which of the still images the user wishes to keep. In one embodiment, the user is given the option of printing the still images using a printing mechanism within the kiosk, to upload the still images to a server computer from which the user may later download the still images, or to have the still images delivered electronically to a destination address supplied by the user (e.g., an email address). Full video album services may be provided as discussed above. The user may be prompted to pay a fee for initial processing, a fee for each still image selected, or a combination of an initial processing fee and an image selection fee.

In another embodiment, scene cuts in a video are automatically detected to create a set of miniature-view keyframes and corresponding timecodes. The miniature-view keyframes, referred to herein as thumbnails, may be presented on the display of a computer system to allow a user to select entry points into the video. For example, if the video has been digitized (or recorded in digital form) and is accessible by the computer system, then the user may select a thumbnail of interest to cause the video to begin playing on the display of the computer system starting at the point in the video at which the thumbnail appears. In this way, a navigable index of the video is established, greatly simplifying the activity of searching a video for subject matter of interest.

Figure 1:
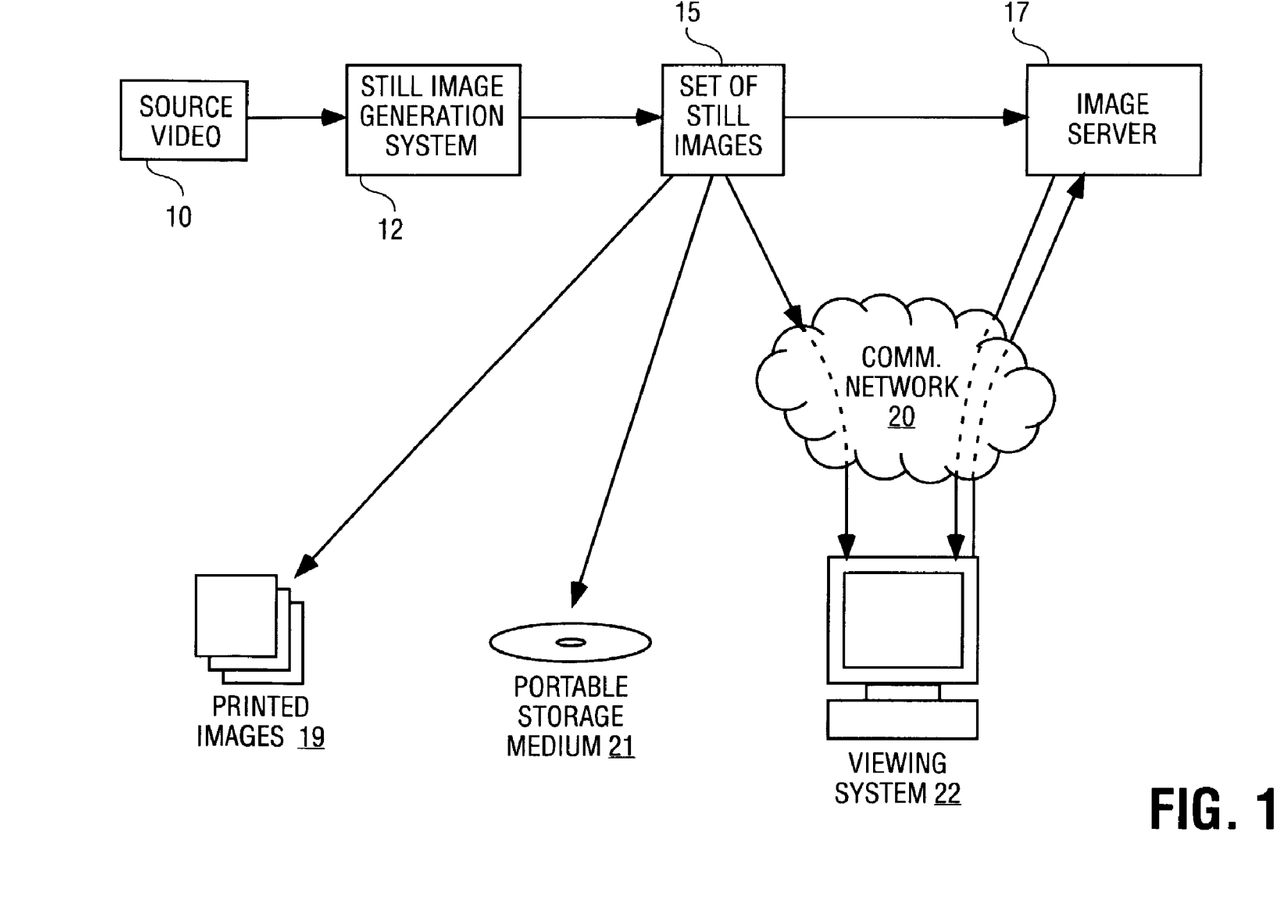
FIG. 1 illustrates use of a still image generation system to generate a set of still images from a source video.

FIG. 1 illustrates use of a still image generation system 12 to generate a set of still images 15 from a source video 10. The source video 10 may be supplied to the still image generation system 12 in a number of forms, including on video recording media such as magnetic tape or disk, optical disk, solid state storage and so forth. Alternatively, the source video 10 may be delivered electronically, for example, by uploading the video via a communications network to the still image generation system 12. The source video 10 may be recorded in a number of different formats, including without limitation standard NTSC (National Television System Code) analog video or in any number of digital video formats. In the case of an analog format, the source video 10 is digitized by the still image generation system 12 before further processing is performed.

In a preferred embodiment, the still image generation system 12 is implemented by a programmed general purpose computer system and a set of one or more media readers, such as a cassette or diskette reader. The media readers may be installed in the computer system or operated as standalone devices which generate an analog or digital video feed. A frame digitizing module (often called a "frame grabber") may be included in the computer system to receive and digitize an analog video signal supplied from an external analog media reader. Alternatively, the external media reader may generate a digital output that can be accepted via a communication port of the computer system.

The set of still images 15 generated by the still image generation system 12 may be output in a number of forms. For example, the still image generation system 12 may include a printing device for generating printed images 19. Alternatively, the set of still images 15 may be recorded on a portable storage medium 21, including on unused recording space on the medium on which the source video 10 was supplied. Further, the set of still images 15 may be output in electronic form appropriate for direct transmission to an end-user viewing system 22 (e.g., via e-mail or electronic courier) or for posting on a server computer 17 that can be accessed via a communications network 20 such as the Internet or other computer network. For example, the set of still images 15 may be posted on a server computer accessible via the World Wide Web (the "Web") so that an end-user may view the posted images using a client computer (e.g., viewing system 22) and select which images of the set 15 to download.

Figure 2:
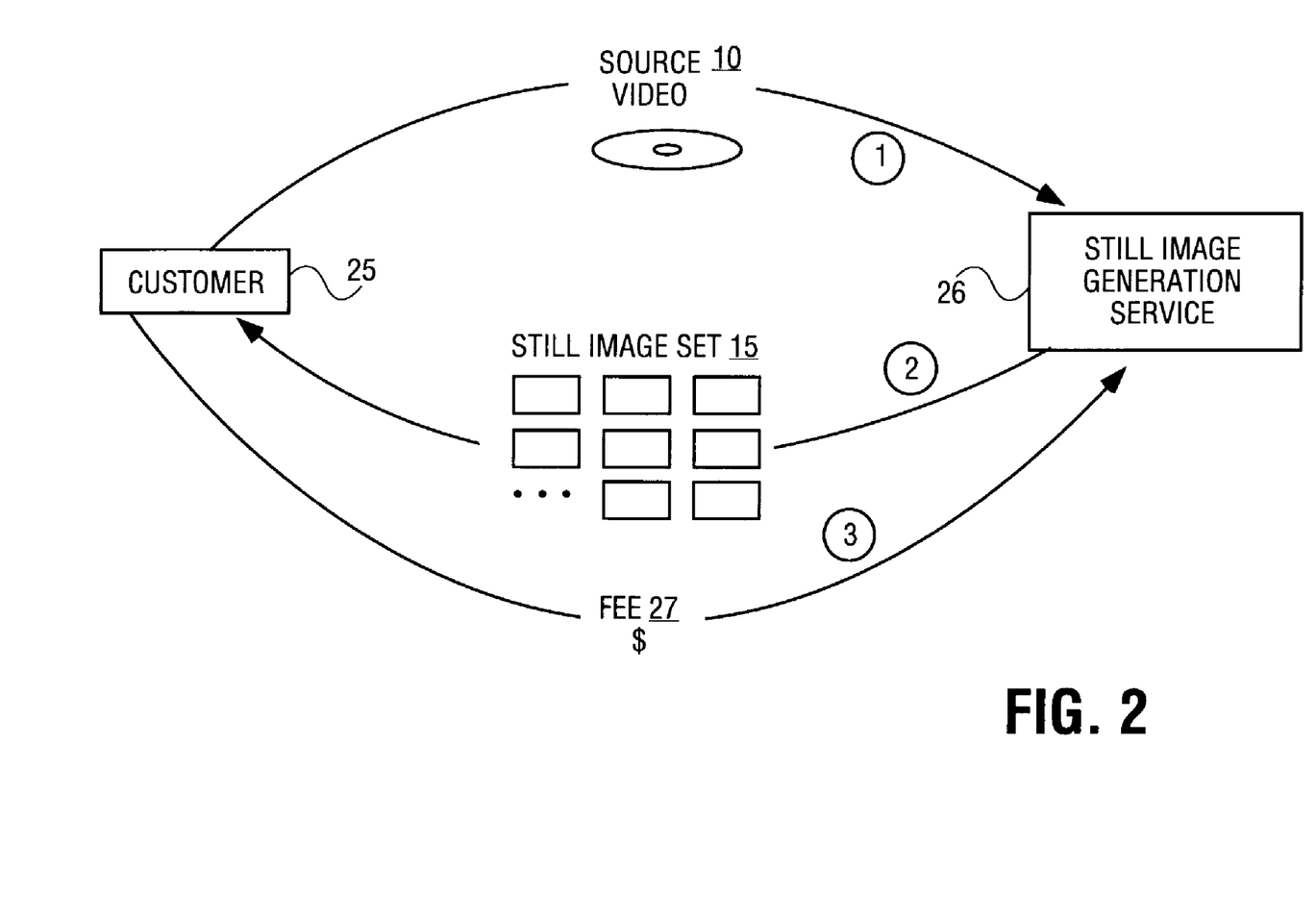
FIG. 2 illustrates a business model for providing a still image generation service according to one embodiment.

FIG. 2 illustrates a business model for providing a still image generation service according to one embodiment. Initially, a customer 25 supplies a source video 10 to a still image generation service 26. The source video 10 may be provided, for example, on a portable storage medium or by electronic transmission. The still image generation service 26 processes the source video 10 to generate a set of still images 15. Finally, the customer provides a fee 27 to the still image generation service in return for the set of still images. The fee may be monetary or a supply of information such as profile information that can be resold to advertisers or other parties interested in demographic information. As discussed above, the set of still images 15 may be provided as a set of prints, a set of images recorded on a storage medium or by electronic transmission. Also, the customer 25 may be permitted to select a subset of the still images, paying a reduced, or per-image fee. The fee 27 may be different for the different types of still images depending on a number of factors such as the number of frames that have been combined to produce the still image, the overall size of the still image (e.g., in area or storage requirements), and so forth. As discussed above, the still image service 26 may be operated as a drop-off service or as a customer-operated kiosk. In the case of the drop-off service, the customer 25 may drop off (or electronically transmit) the source video 10 and receive the set of still images 15 later (e.g., by pickup or by electronic transmission). In the case of a kiosk, the customer 25 may insert the source video 10 into a media reader included in the kiosk and stand by while the source video 10 is being processed. The customer may interact with a user-interface of the kiosk to specify processing criteria and to select which of the set of still images 15 to keep.

In an alternative embodiment, a still image generation system 26 is implemented by a programmed general purpose computer, such as a desktop or laptop computer of a computer user. In that case, still image generation software is sold to the user, for example as shrink-wrap or click-wrap software, and installed on the user's computer system. Additional equipment, such as the above-described media reader and playback device may be required. Thus, the still image generation system 26 may be implemented in the same end-user computer system that is used to provide the viewing system 22 of FIG. 1.

Figure 3:
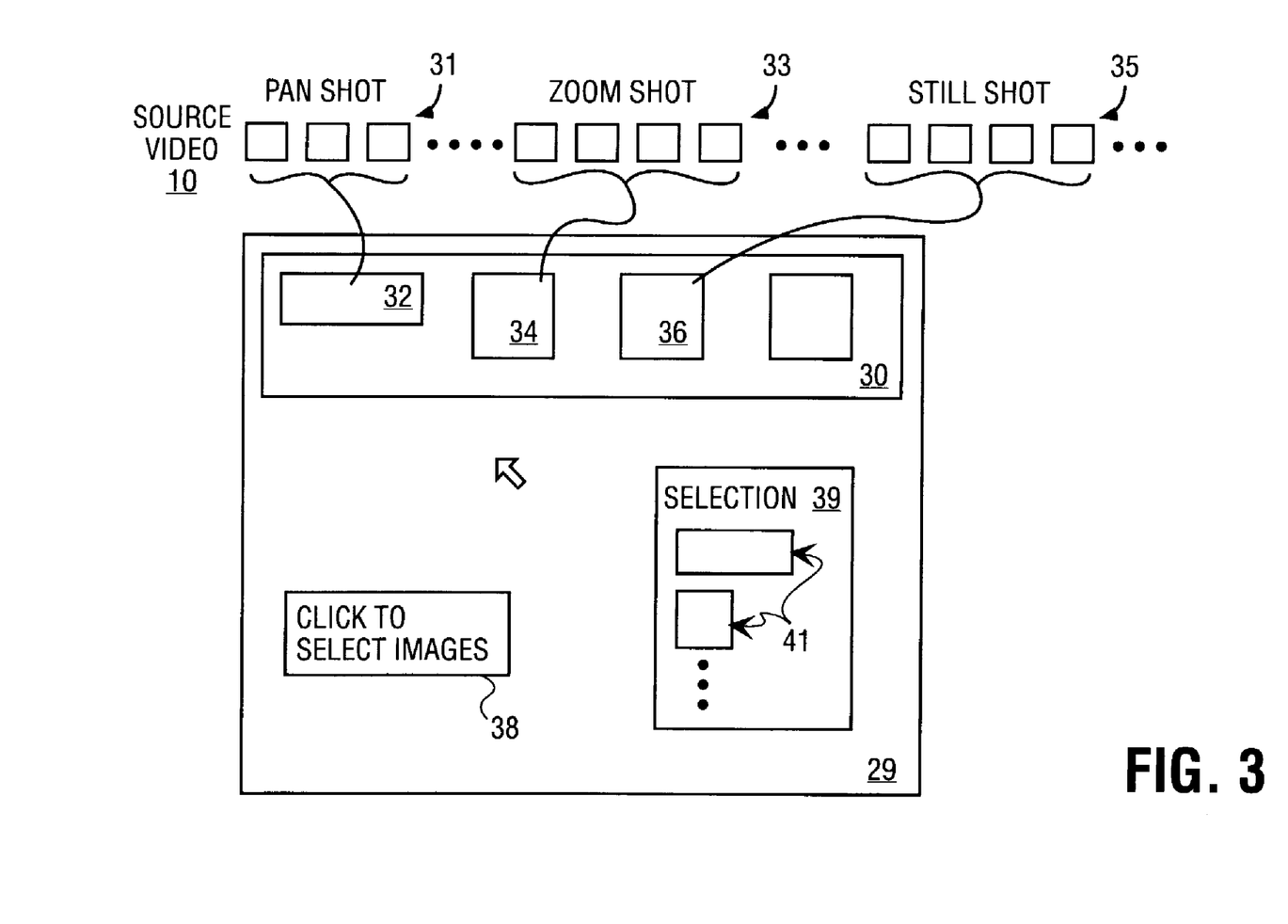
FIG. 3 illustrates a selection window presented on a display of a still image generation system according to one embodiment.

FIG. 3 illustrates a selection window 30 presented on a display 29 of a still image generation system according to one embodiment. The user of the still image generation system (e.g., element 12 of FIG. 1), who may or may not be the person who has requested the set of still images, selects from among thumbnail views of still images (32, 34, 36) presented in the selection window 30, for example, by clicking thumbnails the user wishes to keep. In one embodiment, each selected thumbnail view of a still image (32, 34, 36) is removed from the selection window 30 to a selections list 39. The selected still images 41 may be printed, transmitted or otherwise delivered to the user as they are selected or after all selections have been made. As shown, the individual still images 32, 34, 36 may be obtained from different types of video shots, including pan shots 31 produced by rotation or translation of the video camera, zoom shots 33 produced by zooming the video camera in or out or both, and still shots 35 produced by keeping the video camera stationary or by user-activation of a repetitive capture input which causes a captured frame to be automatically copied to a number of successive frames. The still image generation system may make the still images available one-by-one as they are created from the source video 10, or the entire source video 10 may be processed to generate the complete set of still images before the set of still images is presented to the user of the system.

Figure 4:
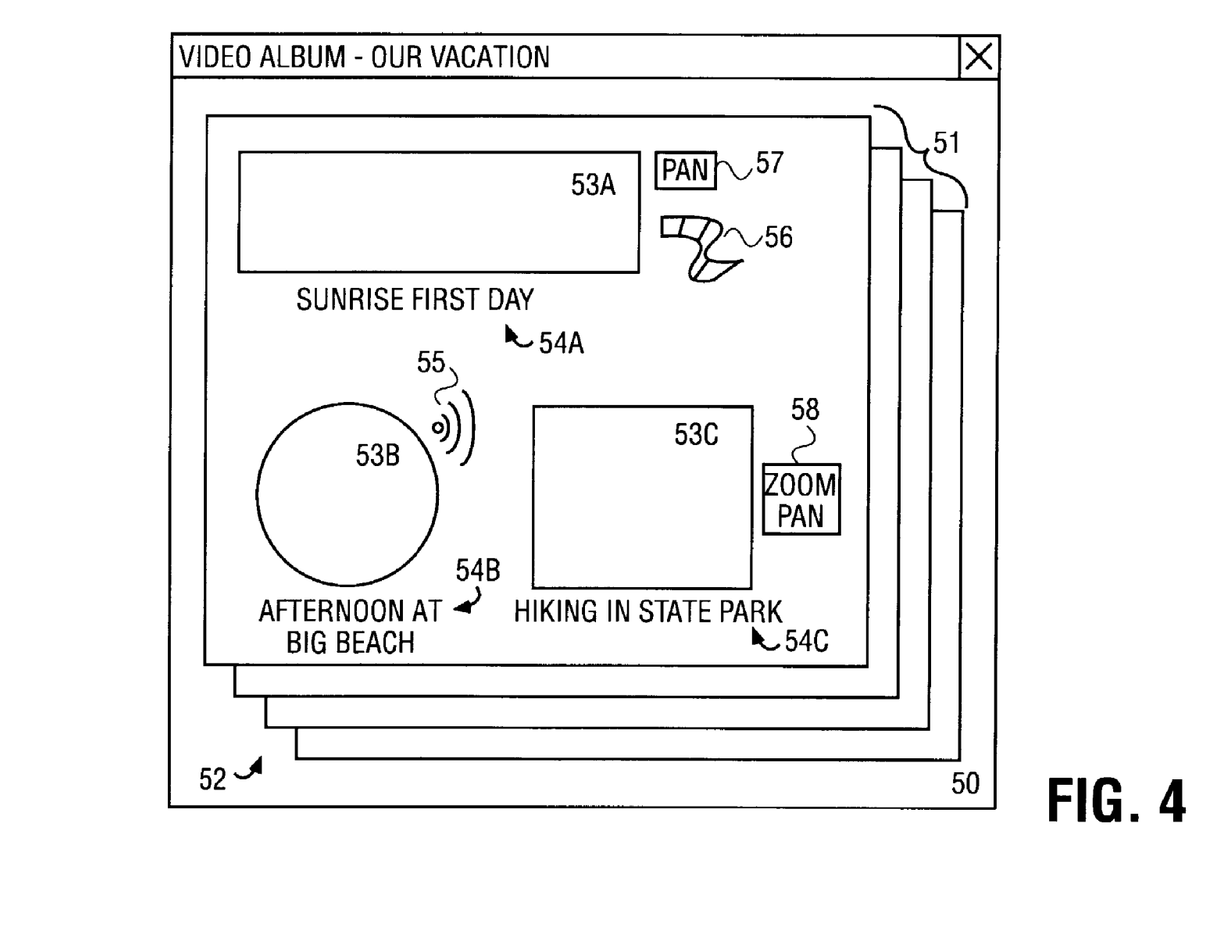
FIG. 4 illustrates a window of a computer system display in which pages of a video album according to one embodiment are presented.

FIG. 4 illustrates a window 50 of a computer system display in which pages 51 of a video album 52 according to one embodiment are presented. The video album 52 contains separately viewable pages each containing one or more still images (53A, 53B, 53C) that have been generated by combining frames of a video. Text descriptions 54A, 54B, 54C are associated with each of the images, and may be automatically extracted from the audio track during video processing. Further, a sound and video icons may be associated with the images in the video album. When a viewer clicks the sound icon 55, a portion of the audio track that corresponds to the video segment used to generate still image 53B is played. Similarly, when a viewer clicks the video icon 56, the video is presented starting at the first frame of the video segment used to generate still image 53A. Virtual reality players may also be associated with the still images presented in the video album 52. For example, a panoramic player is invoked to allow the viewer to pan about within panoramic image 53A when the viewer clicks the PAN button 57. Similarly, a pan and zoom player is invoked to allow the viewer to pan and zoom within the multiple resolution still image 53C.

Although the pages 51 of the video album 52 are shown in FIG. 4 as being cascaded over one another, many alternate arrangements of pages may be used. For example, the pages 51 may be tiled, or individually selected by any number of scrolling techniques. The pages 51 may also be sorted based on a number of different criteria including, but not limited to, order of appearance in the video, nature of still image (e.g., panorama, multiple resolution still, etc.), legend text (e.g., grouping pages containing user-specified keywords together). Similarly, the individual still images of the video album 52 may be reorganized within the video album according to such criteria so that, for example, the video album is chronologically ordered or images are grouped according to subject matter.

Figure 5:
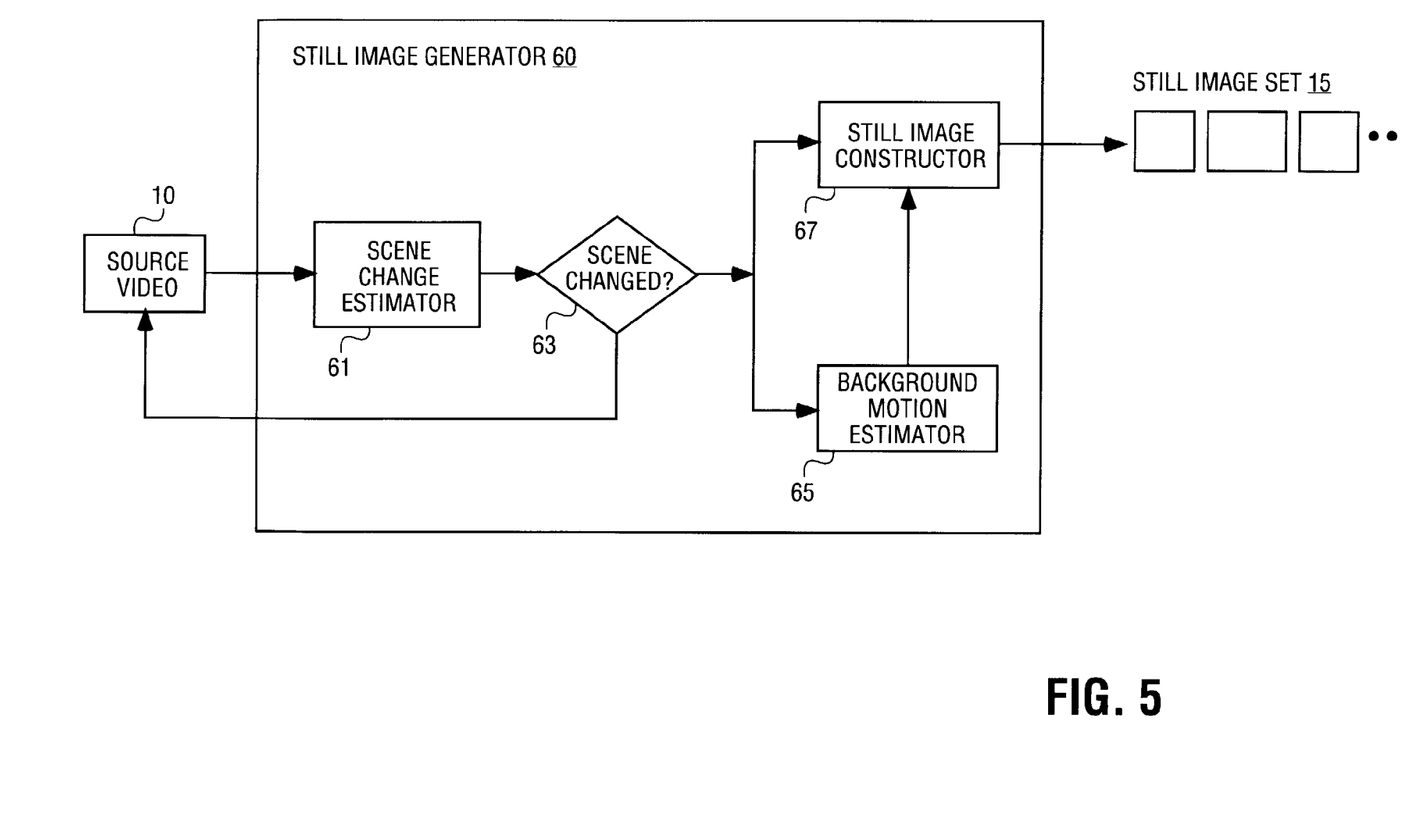
FIG. 5 illustrates a still image generator according to one embodiment.

FIG. 5 illustrates a still image generator 60 according to one embodiment. The still image generator 60 includes a scene change estimator 61, a still image constructor 67, and a background motion estimator 65.

The scene change estimator 61 compares successive frames of the source video 10 to one another to determine when a transformation of a scene in the video frames exceeds a threshold. When applied to an entire source video 10, the effect of the scene change estimator 61 is to segment the sequence of frames in the source video 10 into one or more subsequences of video frames (i.e., video segments or clips), each of which exhibits a scene transformation that is less than a predetermined threshold. The background motion estimator 65 and still image constructor 67 process each video segment identified by the scene change estimator 61 to generate a composite still image having pixel values drawn from two or more of the frames in the video segment. Thus, the predetermined threshold applied by the scene change estimator 61 defines the incremental transformation of a scene which results in construction of a new still image of the still image set 15.

According to one embodiment, the scene change estimator 61 operates by determining a transformation vector for each pair of adjacent video frames in the source video. Herein, a first frame is considered to be adjacent a second frame if the first frame immediately precedes or succeeds the second frame in a temporal sequence of frames.

According to one embodiment, the transformation vector includes a plurality of scalar components that each indicate a measure of change in the scene from one video frame to the next. For example, the scalar components of a transformation vector may include measures of the following changes in the scene: translation, scaling, rotation, panning, tilting skew, color changes and time elapsed.

In one implementation, the scene change estimator 61 applies a spatial low pass filter to the frames of the source video 10 before computing the transformation deltas between adjacent frames. After being low pass filtered, the individual frames in the source video 10 contain less information than before filtering so that fewer computations are required to determine the transformation deltas. In one implementation, transformation deltas are cleared at the beginning of a video segment and then a transformation delta computed for each pair of adjacent frames in the video segment is added to transformation deltas computed for preceding pairs of adjacent frames to accumulate a sum of transformation deltas. In effect, the sum of transformation deltas represents a transformation between a starting video frame in a video segment and the most recently compared video frame in the video segment. In one embodiment, the sum of transformation deltas is compared against a predetermined transformation threshold in decision block 63 to determine if the most recently compared video frame has caused the transformation threshold to be exceeded. The transformation threshold may be a vector quantity that includes multiple scalar thresholds, including thresholds for color changes, translation, scaling, rotation, panning, tilting, skew of the scene and time elapsed. In an alternate embodiment, the transformation threshold is dynamically adjusted in order to achieve a desired ratio of video segments to frames in the source video 10. In another alternate embodiment, the transformation threshold is dynamically adjusted in order to achieve a desired average video segment size (i.e., a desired number of video frames per video segment). In yet another alternate embodiment, a transformation threshold is dynamically adjusted to achieve a desired average elapsed time per video segment. Generally, any technique for dynamically adjusting the transformation threshold may be used without departing from the spirit and scope of the present invention.

In one embodiment, if the most recently compared video frame causes caused the transformation threshold to be exceeded, the scene is deemed to have changed at decision block 63 and the video frame that precedes the most recently compared video frame is deemed to be the ending frame of the video segment. Consequently, if a predetermined transformation threshold is used, each video segment of the source video 10 is assured to have an overall transformation that is less than the transformation threshold. If a variable transformation threshold is used, on the other hand, considerable variance in the overall transformation delta of respective video segments may result and it may be necessary to iteratively apply the scene change estimator to reduce the variance in the transformation deltas.

Figure 6:
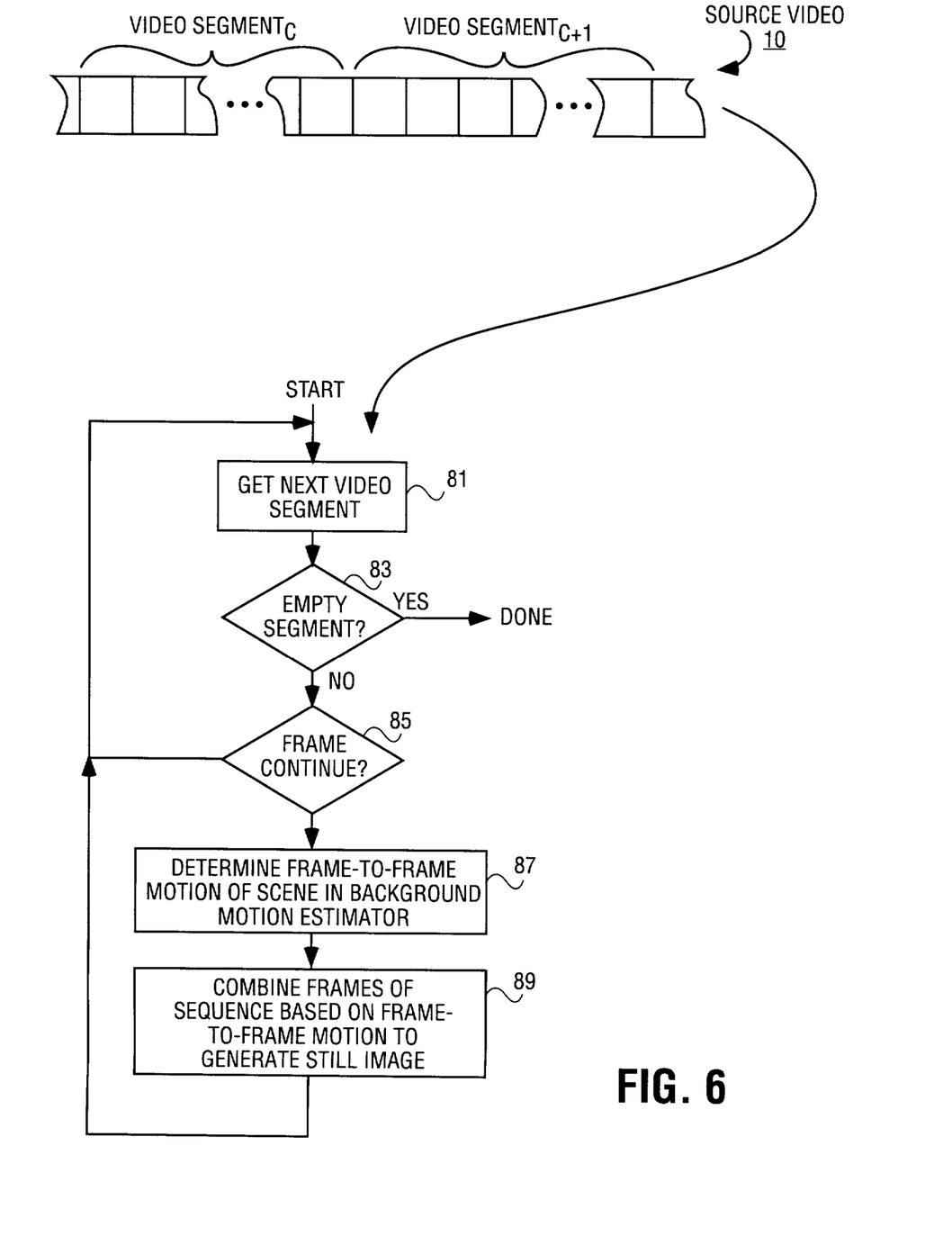
FIG. 6 is a flow diagram of still image construction according to one embodiment.

FIG. 6 is a flow diagram of still image construction according to one embodiment. As discussed above, the scene change estimator effectively resolves the source video 10 into a plurality of video segments each defined by a sequence of frames. Thus, at block 81, the next video segment (e.g., video segment*) within the source video 10 is identified (or selected). If the video segment is determined to be empty at decision block 83 (i.e., the video segment includes no frames), then the end of the video has been reached and still image construction for the source video 10 is completed. Otherwise, the number of frames in the video segment is compared against a threshold number in decision block 85 to determine whether the segment has a sufficient number of frames to produce a still image. The threshold number of frames may be predetermined or adaptively determined based on the lengths of the segments of the source video 10. Also, the user of the still image generation system may specify the threshold number of frames required to produce a still image or the user may specify a starting value that may be adapted according to the lengths of segments of the source video 10. In this way, the user of the still image generation system may control how many still images are generated, setting the threshold value to a high number of frames to reduce the number of video segments from which still images are constructed and setting the threshold value to a lower number to increase the number of video segments from which still images are constructed. Alternatively, in an adaptive system, a target number of still images may be specified so that the threshold number may be automatically increased or decreased during processing to converge on the target number of still images.

If the number of frames in the video segment does not exceed the threshold number of frames, then processing of the next video segment begins at block 81. Otherwise, at block 87, the background motion estimator inspects the video segment indicated by the scene change estimator to identify a dominant motion of the scene depicted in those frames. This dominant motion is considered to be a background motion.

There are a number of techniques that may be used to identify the background motion in a video segment. One technique, called feature tracking, involves identifying features in the video frames (e.g., using edge detection techniques) and tracking the motion of the features from one video frame to the next. Features that exhibit statistically aberrant motion relative to other features are considered to be dynamic objects and are temporarily disregarded. Motions that are shared by a large number of features (or by large features) are typically caused by changes in the disposition of the camera used to record the video and are considered to be background motions.

Another technique for identifying background motion in a video segment is to correlate the frames of the video segment to one another based on common regions and then determine the frame to frame offset of those regions. The frame to frame offset can then be used to determine a background motion for the video segment.

Still other contemplated techniques for identifying background motion in a video segment include, but are not limited to, coarse-to-fine search methods that use spatially hierarchical decompositions of frames in the video segment; measurements of changes in video frame histogram characteristics over time to identify scene changes; filtering to accentuate features in the video segment that can be used for motion identification; optical flow measurement and analysis; pixel format conversion to alternate color representations (including grayscale) to achieve greater processing speed, greater reliability or both; and robust estimation techniques, such as M-estimation, that eliminate elements of the video frames that do not conform to an estimated dominant motion.

Still referring to FIG. 6, the still image constructor receives the background motion information from the background motion estimator in block 89 and uses the background motion information to register the frames of the video segment to one another. Registration refers to spatially correlating video frames in a manner that accounts for changes caused by background motion. By registering the video frames based on background motion information, regions of the frames that exhibit motions that are different from the background motion will appear in a fixed location in only a small number of the registered video frames. That is, the regions move from frame to frame relative to a static background. These regions are considered to be dynamic objects.

In one embodiment, the still image constructor removes dynamic objects from frames of the video segment to produce a processed sequence of video frames. This technique is described in copending U.S. patent application Ser. No. 09/096,720 filed Jun. 11, 1998, which is hereby incorporated by reference in its entirety. At block 89, the still image constructor generates a still image based on the processed sequence of video frames and the background motion information. Depending on the nature of the background motion, construction of the still image may involve combining two or more processed video frames into a single still image, referred to as a composite image. In one embodiment, the composite image may be a panoramic image or a high resolution still image. A panoramic image is created by stitching two or more processed video frames together and can be used to represent a background scene that has been captured by panning, tilting or translating a camera. A high resolution still image is appropriate when the subject of a processed sequence of video frames is a relatively static background scene (i.e., the disposition of the camera used to record the video source is not significantly changed). One technique for creating high resolution still images is to analyze the processed sequence of video frames to identify sub-pixel motions between the frames. Sub-pixel motion is caused by slight motions of the camera and can be used to create a composite image that has higher resolution than any of the individual frames captured by the camera. When multiple high resolution still images of the same subject are constructed, the high resolution still images can be composited to form a still image having regions of varying resolution. Such an image is referred to herein as a multipleresolution still image. As discussed above, when a multiple-resolution still image is displayed during execution of a video album application program on a computer, a user can zoom in or out on different regions of the image. Similarly, a user can pan about a panoramic image. Combinations of pan and zoom are also possible.

Figure 7:
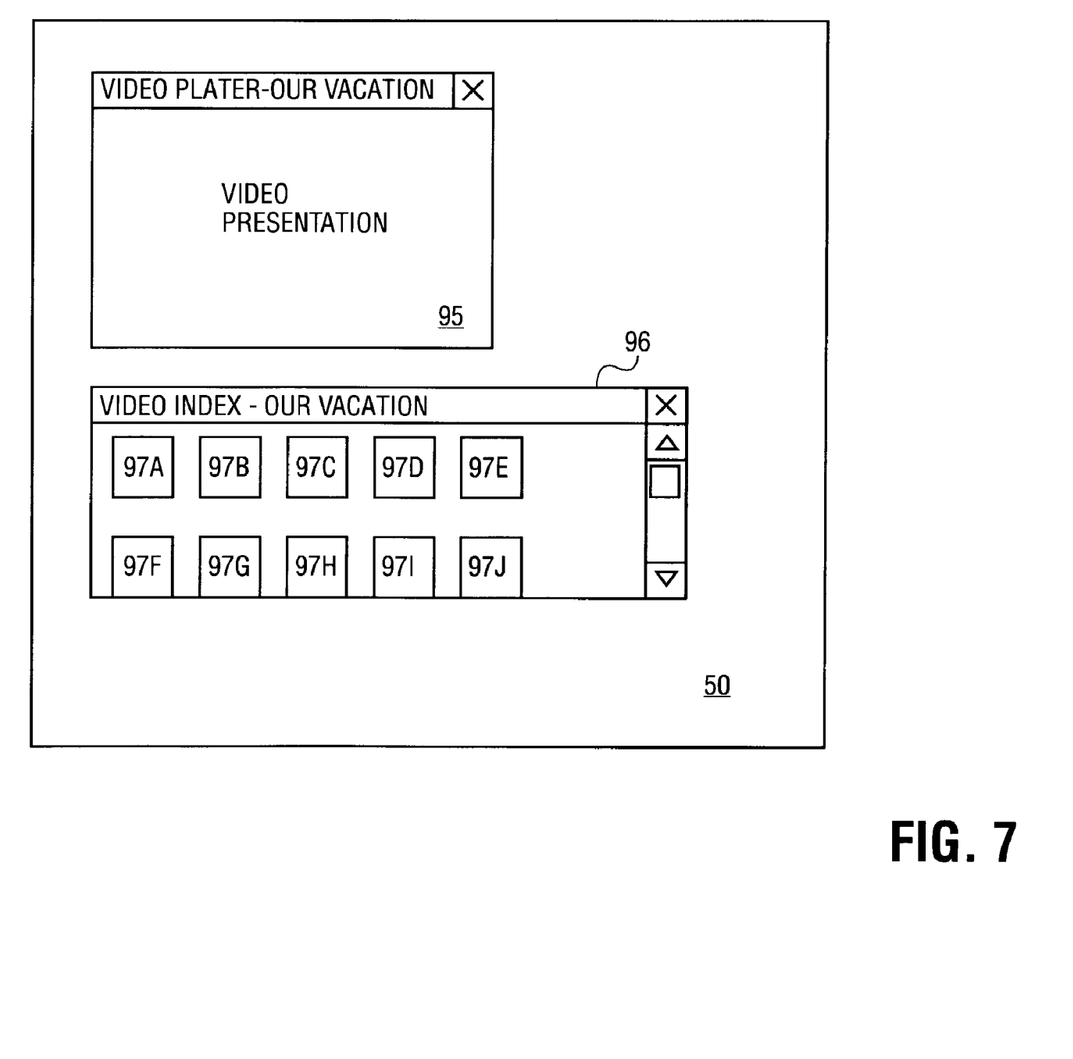
FIG. 7 is a diagram of a video index displayed on a computer system display according to one embodiment.

FIG. 7 is a diagram of a video index 96 displayed on a computer system display 50 according to one embodiment. A video presentation 95 is displayed in one window of the display 50, and the video index 96 is displayed in a separate window. In an alternate embodiment, the video index 96 may be displayed in a tool bar or other location within the same window as the video presentation. The video index 96 contains miniaturized versions (thumbnails 97A–97J) of still images generated from the video presentation. For the purpose of the video index, the threshold number of frames required to signal a still image may be set to a low value so that at least one still image is constructed per scene change. By this arrangement, the still image generation system automatically detects scene cuts in the source video and generates a corresponding still image. Consequently, the video index 96 contains a thumbnail for each scene cut in the source video. In a preferred embodiment, each of the thumbnails 97A–97J is time correlated to the corresponding video segment in the source video by a timecode. Thus, if a user selects a thumbnail of interest in the index, the timecode associated with the thumbnail is used to identify a frame of the video that has a corresponding time offset from the start of the video, and the video is played starting at that time offset. In this way, a user may navigate the video presentation 95 by selecting thumbnails of interest from the video index 96. In an alternate embodiment, the thumbnails 97A-97J may be correlated to the video presentation by sequence numbers instead of by time codes. For example, each frame of the source video may be numbered, so that the number of a video frame that begins a segment of the video used to generate a still image may be associated with a thumbnail of the still image. When the user selects the thumbnail of the still image (e.g., by clicking a mouse button when a cursor controlled by the mouse is positioned over the thumbnail), the source video is played starting at the first frame of the corresponding video segment.

Figure 8:
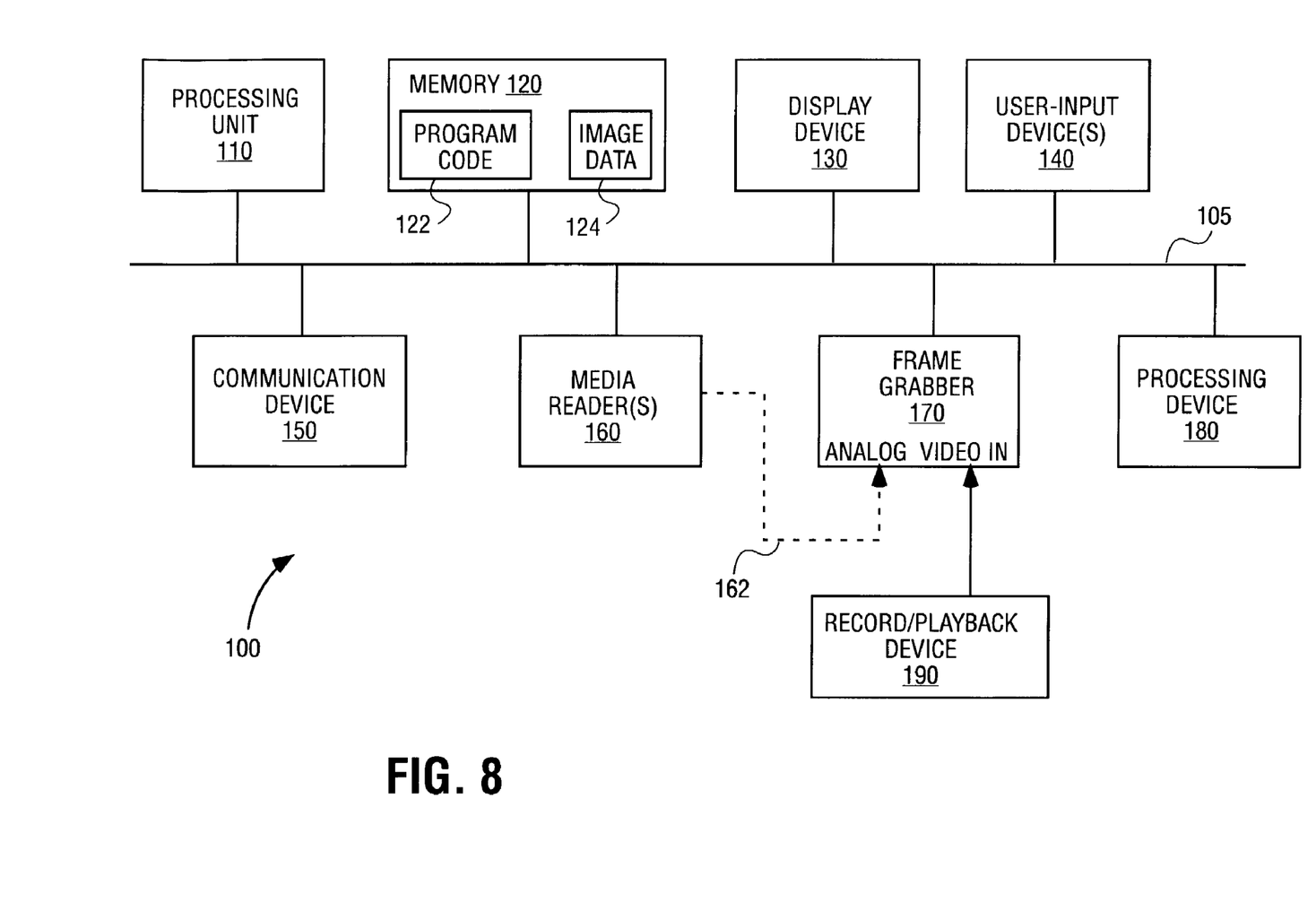
FIG. 8 is a diagram of an embodiment of a processing system that may be used to perform video processing operations.

FIG. 8 is a diagram of an embodiment of a processing system 100 that may be used to perform the above-described processing operations, either as an end-user machine, within a kiosk or as part of a still image generation service. The processing system 100 includes a processing unit 110, memory 120, display device 130, user-input device 140, communications device 150, media reader 160, frame grabber 170 and printing device 180, each coupled to a bus structure 105. When the processing system forms part of a video processing kiosk, the display device 130 and the user-input device 140 may be implemented by a touch-sensitive screen or other simplified user-interface. In alternate embodiments, other devices may be used to manipulate elements displayed on the display device 130 and to allow a user to input information and selections into the processing system 100. The printing device 180 is preferably a high quality color printer, though a black and white printer may also be used. In the case of a video processing kiosk, the printer 180 is preferably enclosed within the kiosk housing, adjacent an opening through which printed output is made available to the kiosk user.

The processing unit 110 may include one or more general purpose processors, one or more digital signal processors or any other devices capable of executing a sequence of instructions. When programmed with appropriate instructions, the processing unit may be used to perform the above-described video processing operations.

The communications device 150 may be a modem, area network card or any other device for coupling the processing system 100 to a computer network. The communication device 150 may be used to generate or receive a carrier wave modulated with a data signal, for example, for transmitting or receiving video frames, still images or text from a server computer on the World Wide Web or other network, or for receiving updated program code or function-extending program code that can be executed by the processing unit 110 to implement various embodiments of the present invention.

The memory 120 may include both system memory (typically, high speed dynamic random-access memory) and various non-volatile storage devices such as magnetic tape, magnetic disk, optical disk, electrically erasable programmable read only memory (EEPROM), or any other computer-readable medium. As shown in FIG. 8, the memory 120 may be used to store program code 122 for performing the above-described processing operations and image data 124. The image data 124 may include, for example, video frames that have been obtained from media reader 160 or from the frame grabber, or still images resulting from combination of video frames. In one embodiment, when power is applied to the processing system 100, operating system program code is loaded from non-volatile storage into system memory by the processing unit 110 or another device, such as a direct memory access controller (not shown). Sequences of instructions comprised by the operating system are then executed by processing unit 110 to load other sequences of instructions from non-volatile storage into system memory, including sequences of instructions that can be executed to perform the above-described video processing operations. Thus, program code that can be executed to perform the above-described video processing operations may be obtained from a computer-readable medium, including the above-described carrier wave, and executed in the processing unit 110.

The media reader 160 may be a video cassette tape reader, an optical disk reader (e.g., Digital Versatile Disk (DVD) or Compact-Disk (CD)), a magnetic disk reader or any other device capable of reading video data from a portable storage media. If the video stored on the portable storage media is in a digital format (as in the case of a digital video camera output, for example), the content may be processed directly by the processing unit 10 to generate a set of still images. If the video is stored in an analog format (e.g., NTSC video), the signal is sampled and converted to a digital representation. The analog-to-digital conversion may be performed by a separate conversion device (not shown), by the frame grabber 170 or by the processing unit 10 itself. The frame grabber 170 is used to convert an analog video signal received from a record/playback device 190 (e.g., a video cassette recorder, DVD player, DIVX player, video camera, etc.) or from the media reader 160 into a digitized set of video frames.

The frame grabber may obtain an analog video signal from the media reader 160 via bus 105 or via a separate transmission path indicated by dashed arrow 162. The output of the frame grabber 170 may be transferred to the memory 120 for processing by the processing unit 110 or processed in place (i.e., within a buffer of the frame grabber) by the processing unit 10.

It should be noted that the individual video processing operations described above may also be performed by specific hardware components that contain hard-wired logic to carry out the recited operations or by any combination of programmed processing components and hard-wired logic. Nothing disclosed herein should be construed as limiting the processing system or other components of a still image generation system to a single embodiment wherein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method of generating photographs from a video, the method comprising:
    identifying segments of the video for which frame-to-frame background motion is less than a threshold; and
    for each of the segments, combining video frames in the segment to generate a photograph representative of the segment.

2. The method of claim 1 further comprising:
    automatically detecting a scene cut in the video; and
    selecting at least one video frame of a segment of the video that follows the scene cut to be a photograph.

3. The method of claim 1 wherein combining the video frames to generate a photograph comprises stitching images in the video frames together to generate a panoramic photograph.

4. The method of claim 1 wherein combining video frames to generate a photograph comprises blending pixels from the video frames to generate a photograph having higher resolution than any one of the video frames.

5. The method of claim 1 wherein combining video frames to generate a photograph comprises blending pixels from the video frames to form a multi-resolution photograph.

6. The method of claim 1 wherein identifying segments of the video for which frameto-frame background motion is less than a threshold comprises identifying a succession of frames of the video that each include a portion of an image in a preceding frame.

7. The method of claim 6 wherein identifying the succession of frames of the video that each include a portion of an image in a preceding frame comprises removing a dynamic object from at least one frame of the succession of frames before comparing the at least one frame to a preceding frame in the succession of frames.

8. An apparatus for generating photographs from a video, the apparatus comprising:

a scene change estimator to identify segments of the video for which frame-to-frame background motion is less than a threshold; and a still image constructor to combine video frames in the segment to generate a photograph representative of the segment.

9. An apparatus for generating photographs from a video, the apparatus comprising:

means for identifying segments of the video for which frame-to-frame background motion is less than a threshold; and means for combining video frames in the segment to generate a photograph representative of the segment.

10. An article of manufacture including one or more computer-readable media that embody a program of instructions for generating photographs from a video, wherein the program of instructions, when executed by a processing unit, causes the processing unit to:

identify segments of the video for which frame-to-frame background motion is less than a threshold; and for each of the segments, combine video frames in the segment to generate a photograph representative of the segment.

11. The article of claim 10 wherein the one or more computer-readable media comprises a portable storage medium in which at least a portion of the program of instructions is embodied.

12. The article of claim 10 wherein the one or more computer-readable media comprises a propagated data signal in which the program of instructions is embodied.

* * * * *